United States Patent
Cruanes et al.

(10) Patent No.: US 12,045,236 B2
(45) Date of Patent: Jul. 23, 2024

(54) JOIN ELIMINATION

(71) Applicant: Snowflake Inc., Bozeman, MT (US)

(72) Inventors: Thierry Cruanes, San Mateo, CA (US); Sangyong Hwang, Sammamish, WA (US); Nitish Jindal, Bellevue, WA (US); Jiaqi Yan, Menlo Park, CA (US); Yongsik Yoon, Sammamish, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/932,140

(22) Filed: Sep. 14, 2022

(65) Prior Publication Data
US 2023/0135440 A1  May 4, 2023

Related U.S. Application Data

(60) Provisional application No. 63/263,301, filed on Oct. 29, 2021.

(51) Int. Cl.
*G06F 16/2453* (2019.01)
(52) U.S. Cl.
CPC .. *G06F 16/24544* (2019.01); *G06F 16/24537* (2019.01)
(58) Field of Classification Search
CPC .................. G06F 16/24544; G06F 16/24537
See application file for complete search history.

(56) References Cited

U.S. PATENT DOCUMENTS

| | | | |
|---|---|---|---|
| 9,652,496 B1* | 5/2017 | Antova | G06F 16/2456 |
| 2003/0033328 A1* | 2/2003 | Cha | G06F 16/2329 |
| 2003/0167258 A1* | 9/2003 | Koo | G06F 16/24535 |
| 2004/0220923 A1* | 11/2004 | Nica | G06F 16/24544 |
| 2009/0055349 A1* | 2/2009 | Ahmed | G06F 16/24537 |
| 2009/0100089 A1* | 4/2009 | Eadon | G06F 16/24554 |
| | | | 707/E17.054 |
| 2014/0279957 A1* | 9/2014 | Moore | G06F 16/26 |
| | | | 707/692 |
| 2016/0026667 A1* | 1/2016 | Mukherjee | G06F 3/0679 |
| | | | 707/714 |
| 2020/0341981 A1* | 10/2020 | Fender | G06F 16/24544 |
| 2022/0309062 A1* | 9/2022 | Ahmed | G06F 16/24535 |

* cited by examiner

*Primary Examiner* — Mark D Featherstone
*Assistant Examiner* — Kweku William Halm
(74) *Attorney, Agent, or Firm* — Schwegman Lundberg & Woessner, P.A.

(57) ABSTRACT

Techniques for join elimination are described herein. Join elimination can identify and eliminate unnecessary joins in a query plan node. For example, join elimination can involve a semantic query optimization technique, which removes reference to a table whose columns are only referenced in join predicates if the joins do not filter/expand rows in the result. Such joins can cause significant performance issues on larger datasets if not optimized.

12 Claims, 15 Drawing Sheets

JOIN ELIMINATION

CROSS-REFERENCE TO RELATED APPLICATION

This application claims the benefit of priority to U.S. Provisional Patent Application Ser. No. 63/263,301 filed Oct. 29, 2021, the contents of which are incorporated herein by reference in its entirety.

TECHNICAL FIELD

The present disclosure generally relates to databases, and in particular, query processing with join elimination.

BACKGROUND

As the world becomes more data driven, database systems and other data systems are storing more and more data. For a business to use this data, different operations or queries are typically run on this large amount of data. Executing queries over large amounts of data can involve long processing times. If the queries scan redundant data, the query processing time is increased. Redundant data for a particular query may be a result of join operations.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Techniques for join elimination are described herein. Join elimination can identify and eliminate unnecessary joins in a query plan node. For example, join elimination can involve a semantic query optimization technique, which removes reference to a table whose columns are only referenced in join predicates if the joins do not filter/expand rows in the result. Such joins can cause significant performance issues on larger datasets if not optimized.

Figure 1:
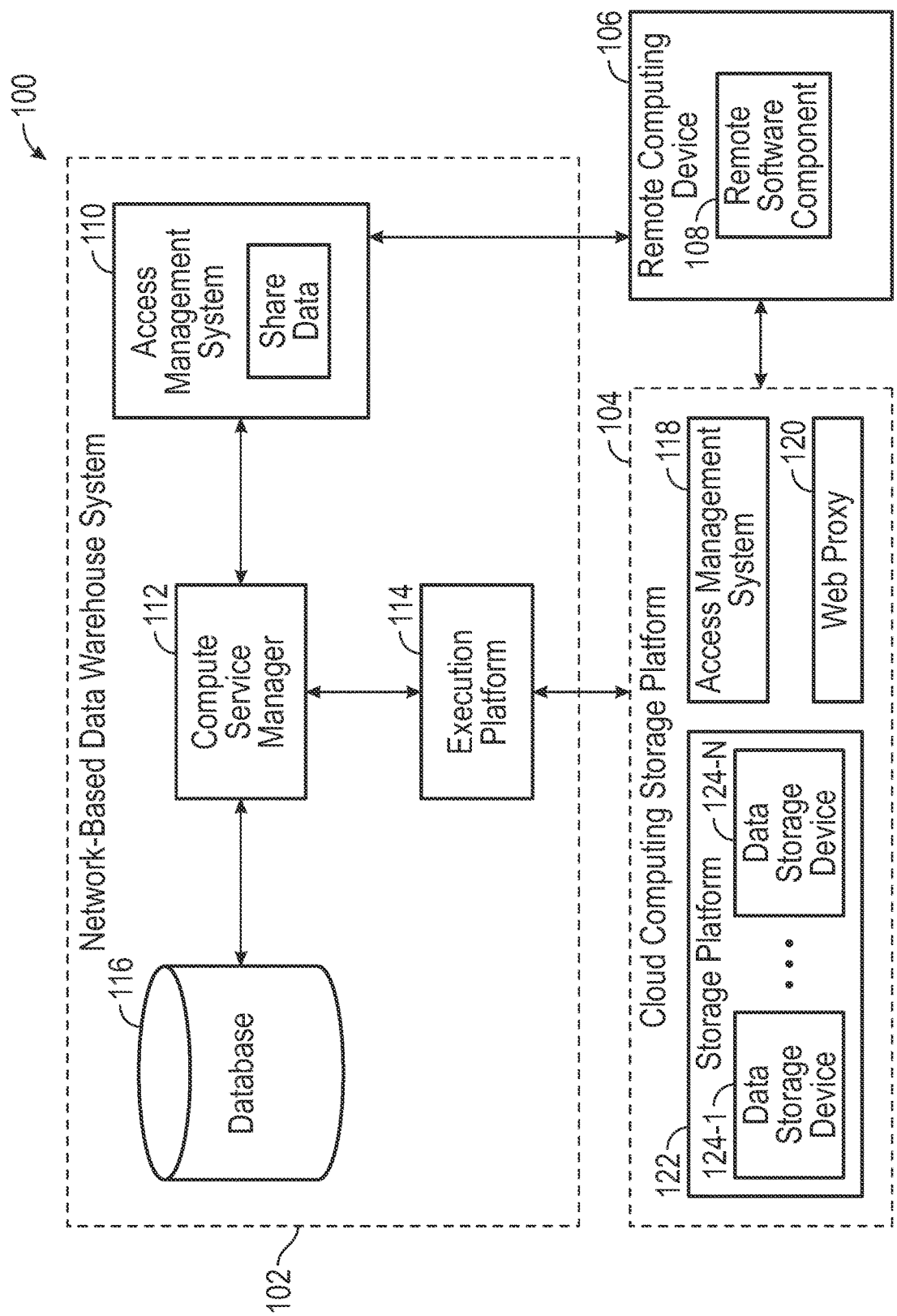
FIG. 1 illustrates an example computing environment in which a cloud database system, according to some example embodiments.

FIG. 1 illustrates an example shared data processing platform 100. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based data system 102, a cloud computing storage platform 104 (e.g., a storage platform, an AWS® service, Microsoft Azure®, or Google Cloud Services®), and a remote computing device 106. The network-based data warehouse system 102 is a cloud database system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based data system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based data system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures, such as streams on shared tables and views.

The network-based data warehouse system 102 comprises an access management system 110, a compute service manager 112, an execution platform 114, and a database 116. The access management system 110 enables administrative users to manage access to resources and services provided by the network-based data system 102. Administrative users can create and manage users, roles, and groups, and use permissions to allow or deny access to resources and services. The access management system 110 can store shared data that securely manages shared access to the storage resources of the cloud computing storage platform 104 amongst different users of the network-based data system 102, as discussed in further detail below.

The compute service manager 112 coordinates and manages operations of the network-based data system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based data system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-N that are part of a cloud computing storage platform 104. In some embodiments, data storage devices 124-1 to 124-N are cloud-based storage devices located in one or more geographic locations. For example, data storage devices 124-1 to 124-N may be part of a public cloud infrastructure or a private cloud infrastructure. Data storage devices 124-1 to 124-N may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based data system 102 and the access management system 118 of the cloud computing storage platform 104 can communicate and share information so as to enable access and management of resources and services shared by users of both the network-based data system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based data system 102 based on the changing data storage/retrieval needs as well as the changing needs of the users and systems accessing the shared data processing platform 100. The support of dynamic changes allows network-based data system 102 to scale quickly in response to changing demands on the systems and components within network-based data system 102. The decoupling of the computing resources from the data storage devices 124-1 to 124-N supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based data system 102 is dynamic and supports regular changes to meet the current data processing needs.

During typical operation, the network-based data system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-N in the cloud computing storage platform 104. Thus, the computing resources and cache resources are not restricted to specific data storage devices 124-1 to 124-N. Instead, all computing resources and all cache resources may retrieve data from, and store data to, any of the data storage resources in the cloud computing storage platform 104.

Figure 2:
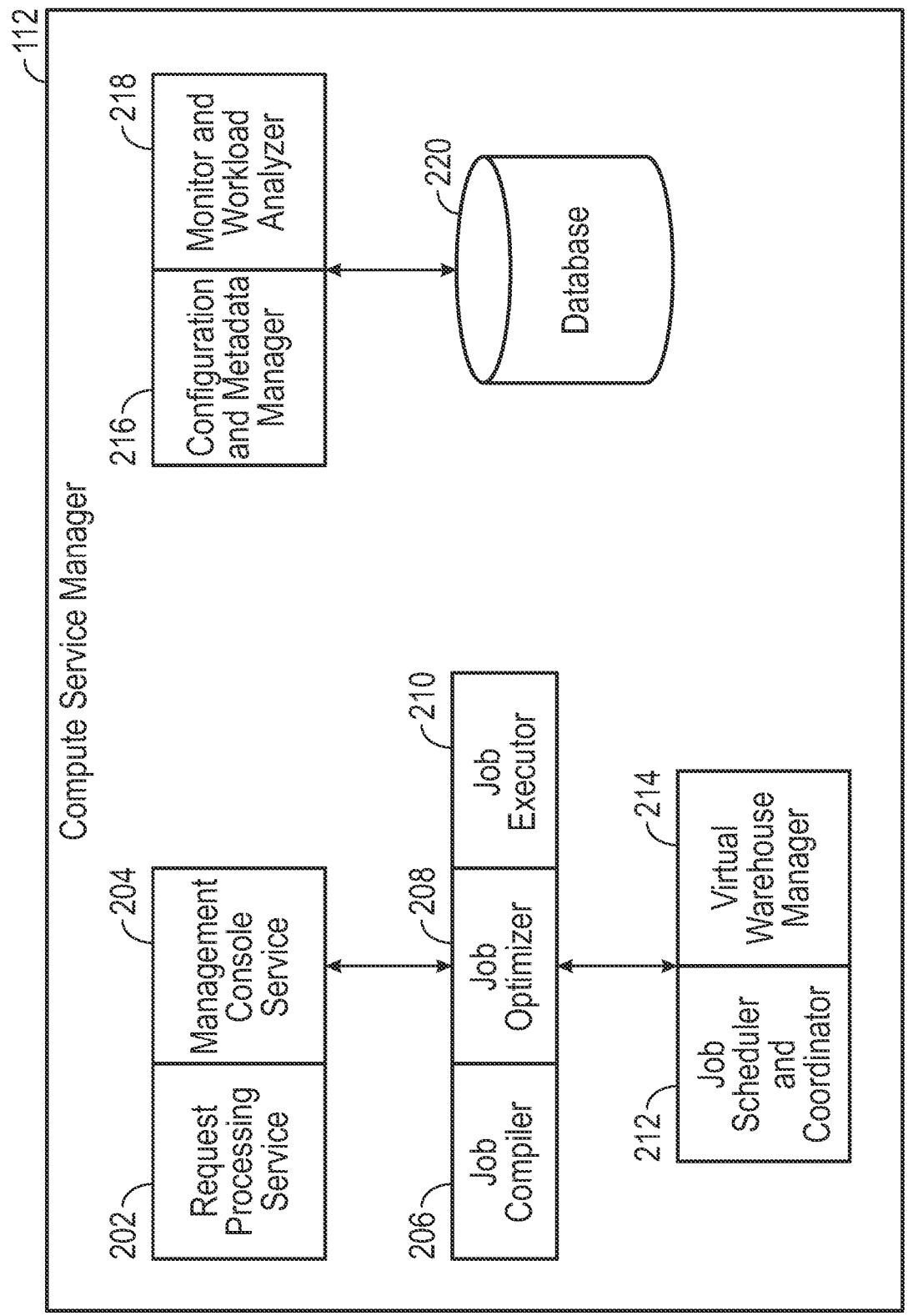
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based data system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based data system 102. For example, data storage device 220 may represent caches in execution platform 114, storage devices in cloud computing storage platform 104, or any other storage device.

Figure 3:
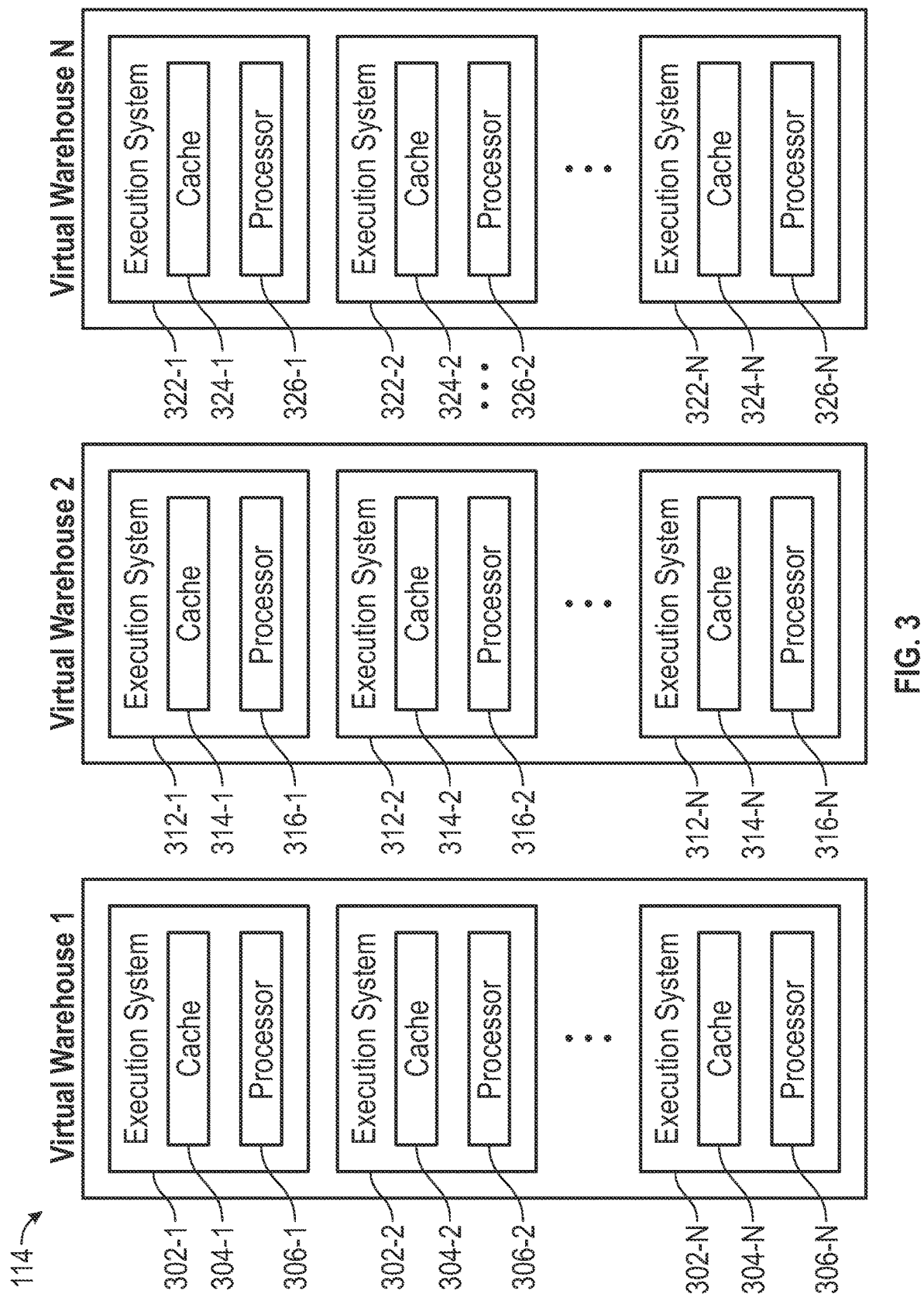
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-N shown in FIG. 1. Thus, the virtual warehouses are not necessarily assigned to a specific data storage device 124-1 to 124-N and, instead, can access data from any of the data storage devices 124-1 to 124-N within the cloud computing storage platform 104. Similarly, each of the execution nodes shown in FIG. 3 can access data from any of the data storage devices 124-1 to 124-N. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Next, techniques for join elimination will be described. A query can be inefficient when it includes redundancies due to one or more unnecessary joins. Join elimination can identify and eliminate unnecessary joins. Join elimination can involve a semantic query optimization technique, which removes reference to a table whose columns are only referenced in join predicates if the joins do not filter/expand rows in the result. Join elimination can be performed based on defined Constraints, as well as automatically recognized query properties and data properties. Such joins can cause significant performance issues on larger datasets if not optimized.

A key join is a join where the join predicate equates every column of a left table to a corresponding column of a key of the right table. The left table in a key join can be redundant based on the type of join. Redundant Joins based on Join Keys can be categorized into: primary key (PK)-foreign key (FK) join+no other column from PK table except PK columns; PK-PK self-join; right outer join on a unique key of the left table (with equalities to arbitrary columns in the right table)+no columns of the left table are referenced in the query. These conditions can reverse when the right table is considered instead of the left table.

The join elimination techniques described herein can handle different types of join operations such as unique-key (UK) outer join elimination. The techniques can include join predicates which are considered equi-join on columns directly (e.g., A.C1=B.C1, where A is the left table, B is the right table, and C1 identifies a column). Multi-column joins can also be supported. The techniques can support joint elimination for SELECT queries, including Create Table As Select (CTAS) commands. The techniques can also support self join elimination (including PK-PK and UK-UK) and PK-FK join elimination, as described in further detail below.

Figure 4:
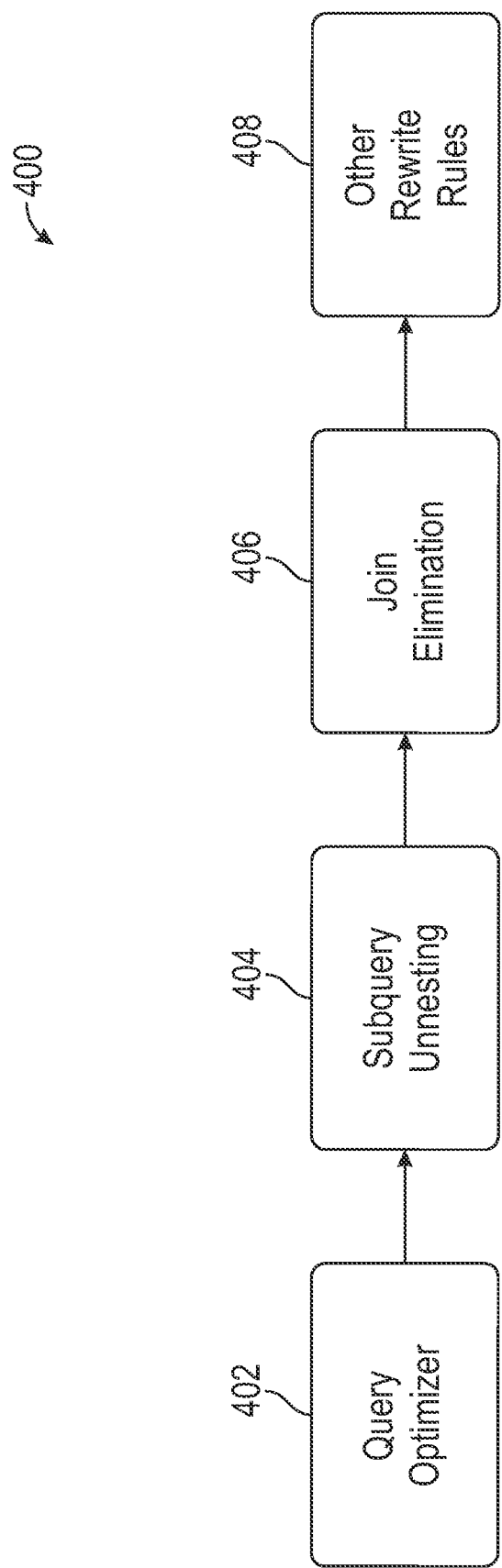
FIG. 4 illustrates a high-level block diagram of a framework for query processing, according to some example embodiments.

FIG. 4 illustrates a high-level block diagram of a framework 400 for query processing, according to some example embodiments. The framework 400 may be executed by a compute service manager and assigned execution platforms as described herein (e.g., compute service manager 112, execution platform 114). The framework 400 includes a query optimizer 402, a subquery unnesting element 404, a join elimination 406, and other rewrite rules 408. After a query is received, it may be processed and then input into the query optimizer 402. The query optimizer 402 may perform operations to optimize certain parts of the query. Query optimizer 402 may receive a query plan and transform the query plan that is semantically equivalent to the original query plan so that it can be executed faster. For example, for a join between two tables A and B, the query optimizer 402 can identify whether the join should be evaluated as A Join B or B Join A.

The subquery unnesting element 404 may unnest subqueries in the query. Unnesting may include removing operators from subqueries and merging the subquery into the body of the main query or it may turn the subquery into an inline view. The subqueries may include joins and unnesting may assist in identifying those joins. Join elimination 406 may be performed to eliminate redundant processing, as described in further detail below. Other rewrite rules 408 may be applied to further refine the query for processing.

Figure 5:
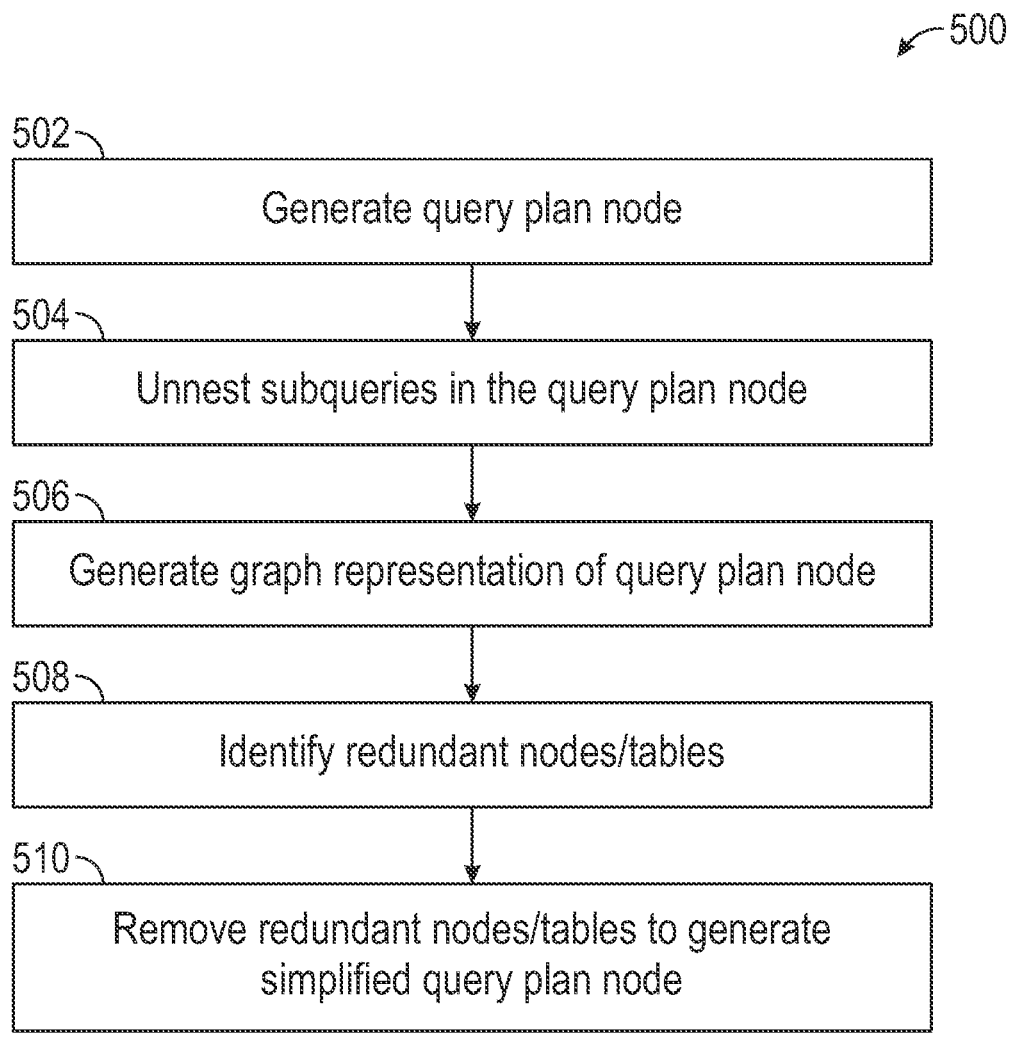
FIG. 5 illustrates a high-level block diagram of a framework for join elimination, according to some example embodiments.

FIG. 5 illustrates a flow diagram for a method 500 for join elimination, according to some example embodiments. The method 500 may be executed by a compute service manager and assigned execution platforms as described herein (e.g., compute service manager 112, execution platform 114). At operation 502, a query may be received, and a corresponding query plan node (also referred to as query plan node tree or tree of query plan nodes) may be generated. At operation 504, subqueries in the query plan node may be unnested. The unnesting may reveal redundancies in the query plan node. At operation 506, a graph representation of the query plan node may be generated. The graph representation may include a data structure of the query plan with nodes and edges. Nodes can represent tables that are part of the main query and edges can indicate relationships (e.g., join relationships) between nodes.

Row Vector is a unique set of expressions for a query plan node. For example, for query like select a from t. then row vector for table scan (t) would contain expression (a). The graph representation may be constructed from the query plan node starting from a top-level join node. While traversing the query tree, the graph may be created where: a) each vertex represents a table involved in a join with information, such as Produced Row Vectors (columns produced from the tables which are used in a join clause) and JoinClause Row Vectors (columns used in a join clause); and b) an edge would indicate the join clause relationship information.

At operation 508, the graph representation may be used to identify redundant nodes/tables based on rules described in further detail below. The criteria for selecting a candidate for join elimination can include whether the candidate is involved in the join with only one table, the candidate's column is appearing only on the edge, and/or the candidate column has a distinct property (described in further detail below). The rule application can be iterated over a candidate list to check whether the candidates can be removed. Trace would be emitted as well to capture potential queries that can benefit.

At operation 510, the identified redundant nodes/tables in the graph representation may be removed from the query plan node (and the graph representation) to generate a simplified query plan node. The simplified query plan node may then be executed to generate query results without processing redundant tables, leading to faster processing times.

Figure 6A:
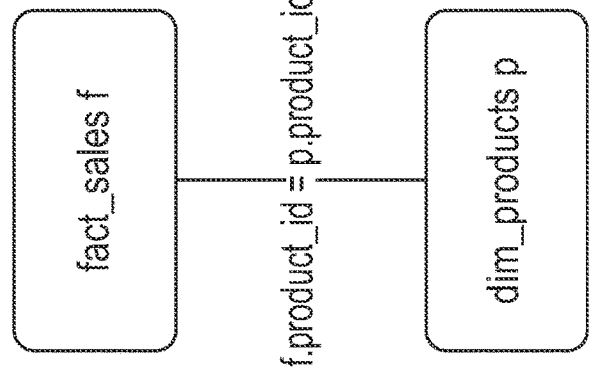
FIGS. 6A-6C illustrate an example of join elimination, according to some example embodiments.
Figure 6A:
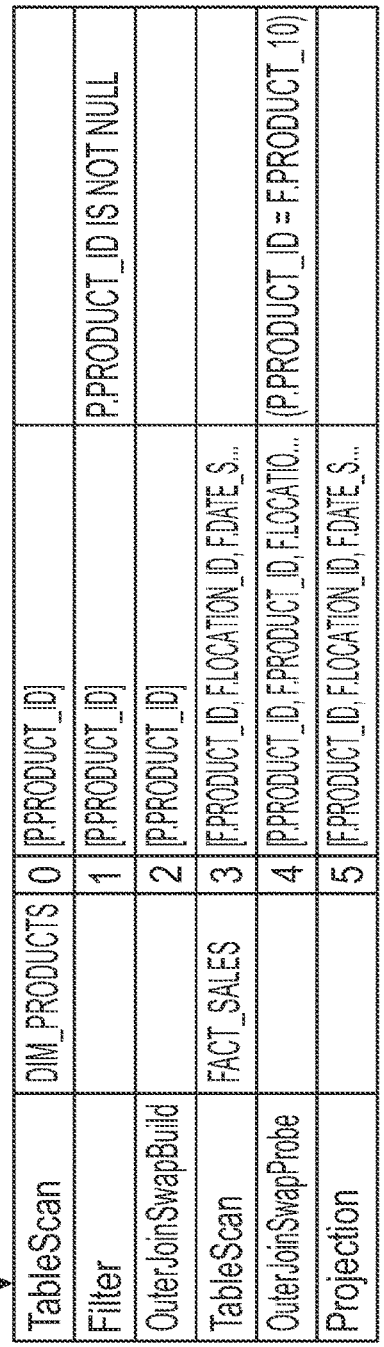
Figure 6B:
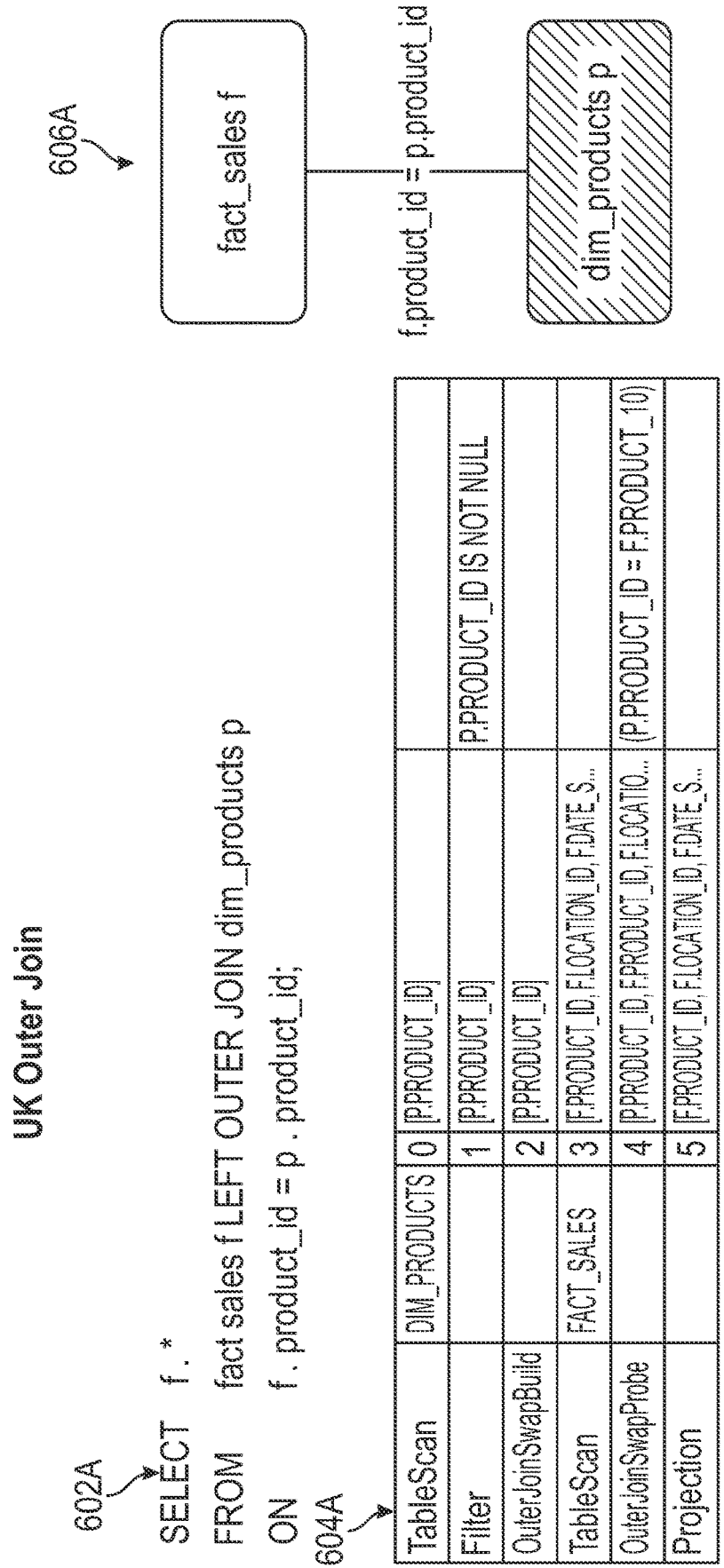
Figure 6C:

Next, some examples of join elimination using the techniques described herein will be discussed. FIGS. 6A-6C illustrate join elimination for a UK outer join, according to some example embodiments. In FIG. 6A, a query 602A is shown:

| | |
|---|---|
| SELECT | f.* |
| FROM | fact sales f LEFT OUTER JOIN dim_products p |
| ON | f.products_id = p.product_id; |

A query plan node 604A is shown with six operators, including TableScan (dim_products p), Filter, OuterJoinSwapBuild, Tablescan (fact_sales f), OuterJoinSwapProbe, and Projection. A simplified graph representation 606A of the query plan node 604A is shown. As shown in FIG. 6B, the table dim_products p is identified as a redundant table. The redundant table is then removed from the query. As shown in FIG. 6C, the query is simplified by removing the identified redundant table. The simplified query 602B removes dim_products p, and the query plan node 604B includes two operators including Tablescan (fact_sales f) and Projection, which is illustrated in the graph representation 606B. Thus, the UK outer join was effectively eliminated using the techniques described herein.

Figure 7A:
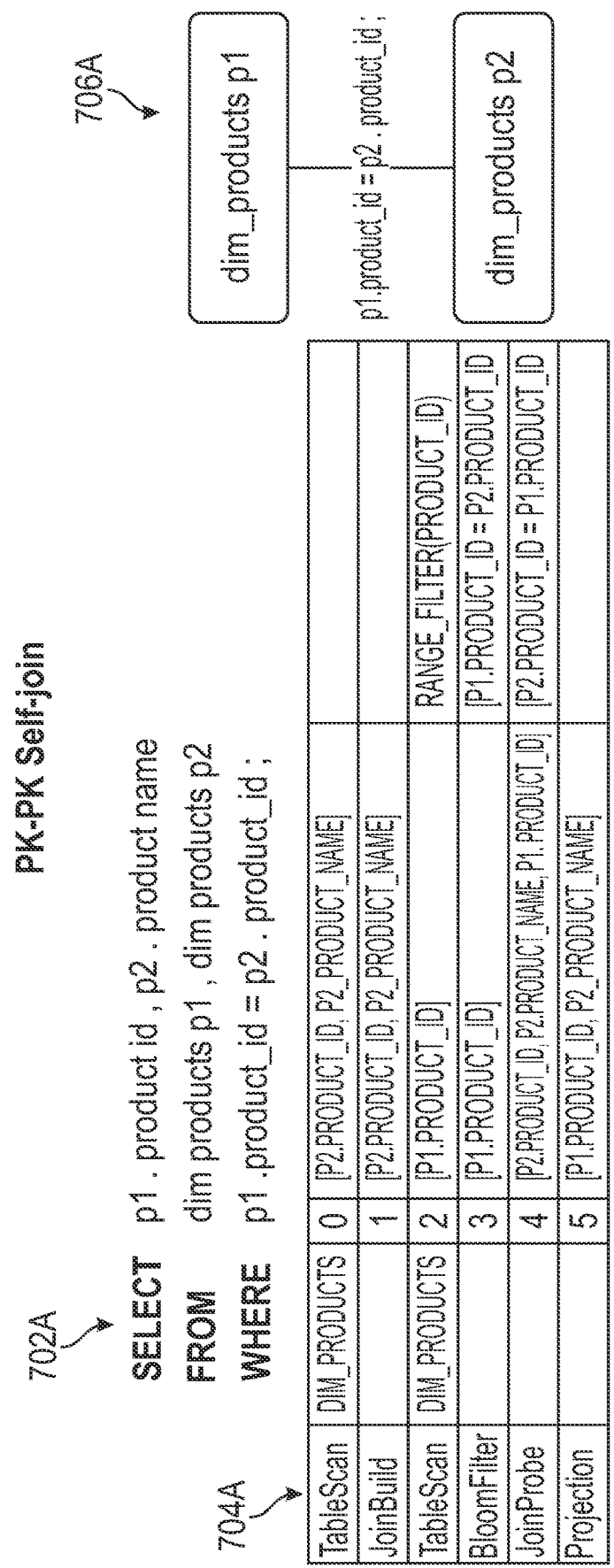
FIGS. 7A-7C illustrate an example of join elimination, according to some example embodiments.
Figure 7B:
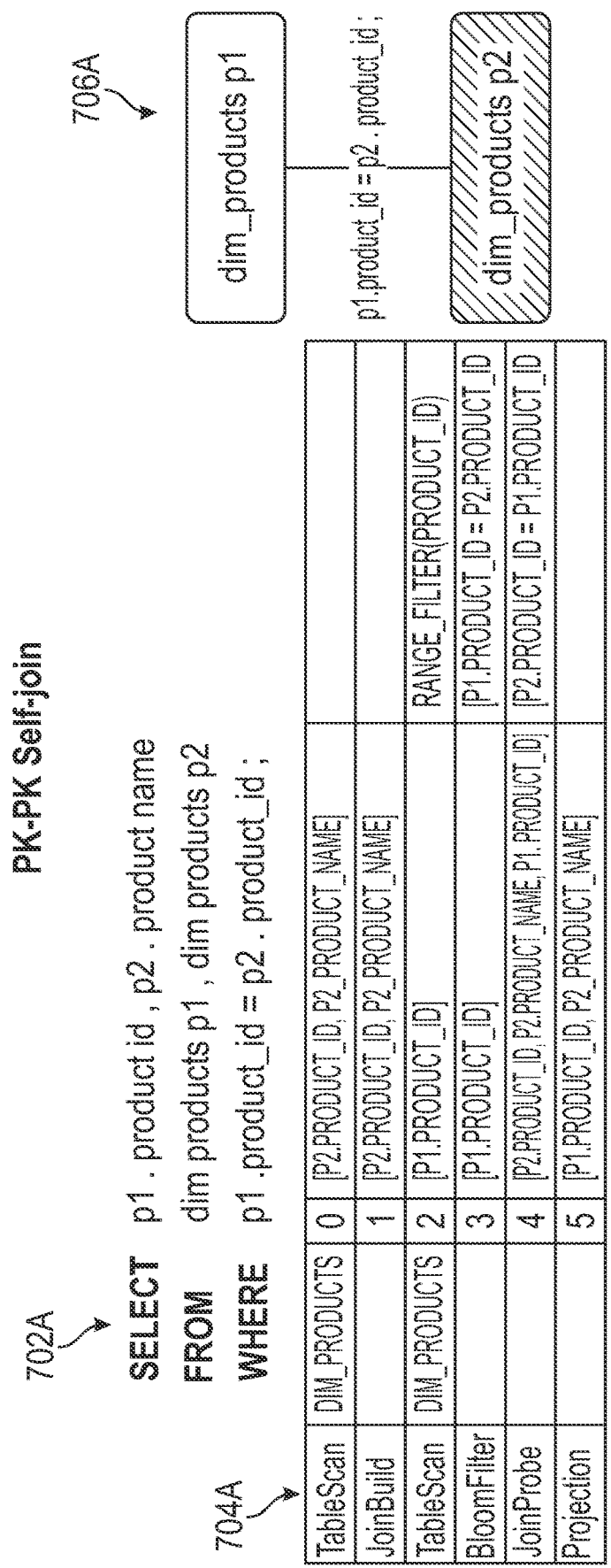
Figure 7C:
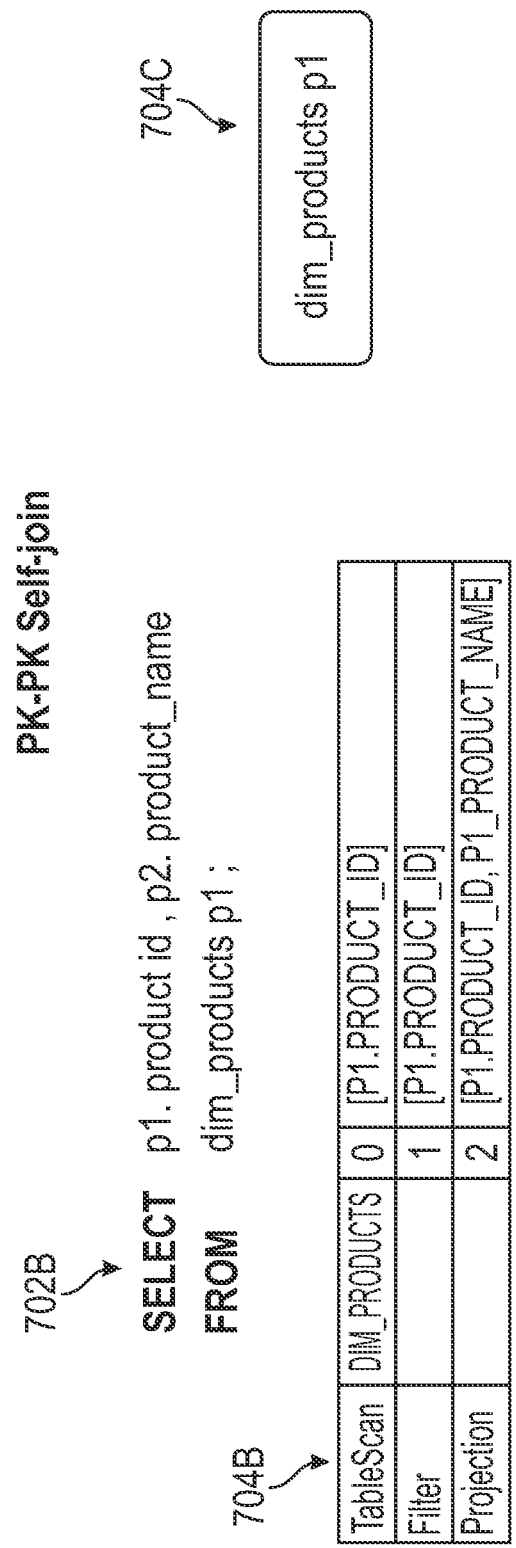

FIGS. 7A-7C illustrate join elimination for a PK-PK self-join, according to some example embodiments. In FIG. 7A, a query 702A is shown:

| | |
|---|---|
| SELECT | p1.product id, p2.product name |
| FROM | dim products p1, dim products p2 |
| ON | p1.product_id = p2.product_id; |

A query plan node 704A is shown with six operators, including TableScan (dim_products p1), JoinBuild, Tablescan (dim_products p2), BloomFilter, JoinProbe, and Projection. A simplified graph representation 706A of the query plan node 704A is shown. As shown in FIG. 7B, the table dim_products p2 is identified as a redundant table. The redundant table is then removed from the query. As shown in FIG. 7C, the query is simplified by removing the identified redundant table. The simplified query 702B removes dim_products p2, and the query plan node 704B includes three operators including TableScan (dim_products p1), Filter, and Projection, which is illustrated in the graph representation 704C. Thus, the PK-PK self-join was effectively eliminated using the techniques described herein.

Figure 8A:
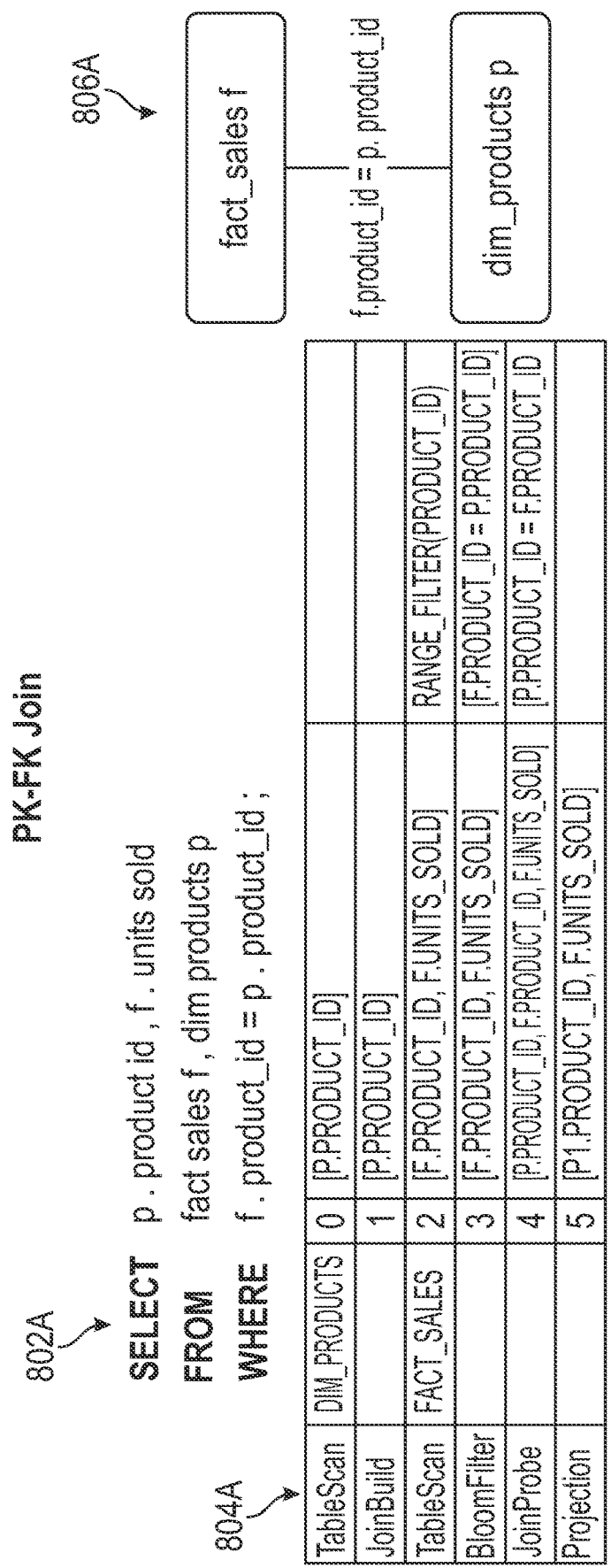
FIGS. 8A-8C illustrate an example of join elimination, according to some example embodiments.
Figure 8B:
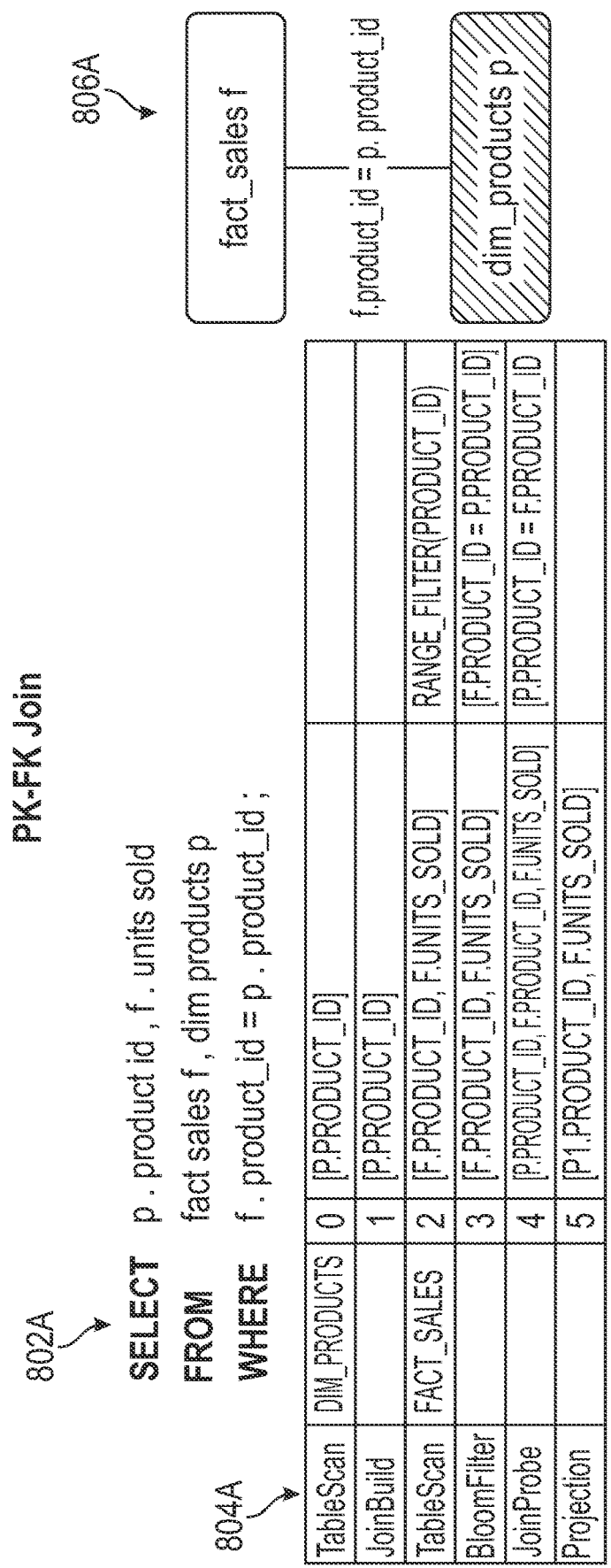
Figure 8C:
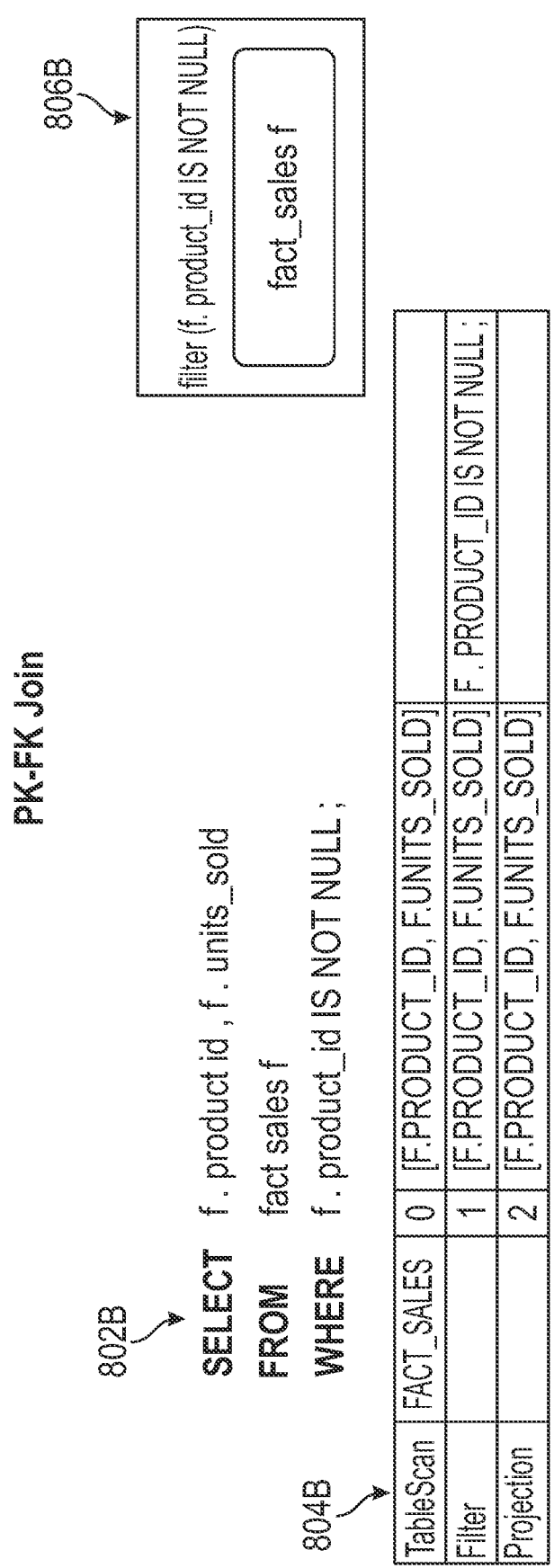

FIGS. 8A-8C illustrate join elimination for a PK-FK join, according to some example embodiments. In FIG. 8A, a query 802A is shown:

| | |
|---|---|
| SELECT | p1.product id, f.units sold |
| FROM | fact sales f, dim_products p |
| ON | f.products_id = p.product_id; |

A query plan node 804A is shown with six operators, including TableScan (dim_products p), JoinBuild, Tablescan (fact sales f), BloomFilter, JoinProbe, and Projection. A simplified graph representation 806A of the query plan node 804A is shown. As shown in FIG. 8B, the table dim_products p is identified as a redundant table. The redundant table is then removed from the query. As shown in FIG. 8C, the query is simplified by removing the identified redundant table as being included in fact_sales f. The simplified query 802B removes dim_products p and adding in a filter (f.product_id is not null), and the query plan node 804B includes three operators including Tablescan (fact_sales f), Filter, and Projection, which is illustrated in the graph representation 806B. Thus, the PK-FK join was effectively eliminated using the techniques described herein.

Query properties (separate from data properties) can also be used for join elimination. The system can check the query operator node involved in the join to determine if it can be removed. This can be performed in multiple ways. In some embodiments, the system can use a subsumption property. Here, the system can check if the sub-query tree can be subsumed by the other query tree, the system can simplify the query plan by removing the subsumed tree. That is, potential redundant joins can be identified by analyzing subsumption properties from the Join Graph (i.e., graph representation) or the Query Plan Node Tree. Conditions may be set for detecting candidates including subsumption derivation for filter operations as well as aggregations. These may find application for anti-join and semi-join conditions. Here, the system may check whether the join graphs in the subsuming subplan is a subgraph of the subsumed subplan.

Top-level join graphs may be compared. In the subsumed subplan, the join graph in the subsuming subplan can be inner joined with other relations or in the outer side of a left outer join, semi-join, or anti-join. The filtering in the subsuming subplan can be subsumed by the filtering in the subsumed subplan.

Distinctness property from the query operator can also be used for join elimination. This can be applied for upstream query execution. For operations that produce distinct outputs, e.g., grouping keys in grouping operations, these properties can be propagated downstream and used for recognizing join elimination opportunities. For example, a Group By operator can generate the distinct rows on the group by columns. This group-by information can be leveraged to remove the redundant subtree.

Data properties can be used for join elimination. The system can derive distinct properties using data stored in the table. In some embodiments, both query and data properties may be used for join elimination in conjunction.

Different techniques may be used to derive distinct properties of the data. In some embodiments, the distinct properties can be derived based on constraint properties. Here, constraint properties are enabled at the time of data loading, so processing work enforcing the constraint properties is completed before query processing. Thus, leveraging constraint properties for join elimination may involve less processing during query processing; however, it may involve more processing beforehand for enforcing the constraints in some examples.

Redundant joins can be eliminated based on constraints defined on single/multiple tables. As described above, a multi-query block join graphs may be built. Based on the graphs, potential join elimination candidates may be identified based on join types and join graph topology. Portions of the graph with no candidates can be skipped during join elimination. The system may loop up constraints (e.g., PK/UK/FK constraints) on target join keys, which may include base columns or expressions. For join keys that are expressions, the system can identify a subset of scenarios where join elimination can be applied directly based on base columns in the expressions, regardless of the properties of functions used in the expression. For other scenarios, join elimination can be implemented when the expressions consist of functions with certain properties. Moreover, the system can optimize constraint layout in underlying metadata store to speedup lookups of specific types of constraints (e.g., foreign keys) defined on specific subset of columns.

In some embodiments, a user visible parameter (e.g., configuration or metadata parameter) may be implemented (e.g., USE_CONSTRAINT-IN_QUERY_OPTIMIZATIONS). When this parameter is enabled, it can be used to identify redundant nodes for join elimination (along with RELY property). In some embodiments, a new constraint property may be introduced (ENABLE_FOR-REWRITE). The user can set this property to leverage constraint information during query optimization for join elimination. The default value may be set as false. In some embodiments, the RELY property may be used. RELY property defines whether a constraint should be relied on in query optimization. Here, the default may be set as false. Users can set this property to leverage constraint information during query optimization.

In some embodiments, the distinct property can be derived using metadata such as expression properties (EPs). Here, processing to identify distinct properties can be done during query processing, but may involve minimal processing beforehand. For this technique, metadata on a table may be used to find distinct property on a given set of column(s). Distinct properties may be derived at a global level or after pruning. In the global level, data in a column for a table may be determined to have a distinct value. After pruning may entail that a subset of data in a column needed for query processing has the distinct property.

This metadata-derivation technique can eliminate redundant tables which do not have constraints defined but for which no desired property is set. For example, a group-by information can be used since it generates distinct properties. Thus, join elimination may be eliminated without explicitly enforcing constraints, which can reduce cost and overhead associated with constraint enforcement. The system may automatically recognize EPs that provide same information to perform join elimination without constraints. For example, distinct properties can be derived automatically without using Constraints at various stages, including automatically identifying distinctness properties during data ingestion, identifying distinctness properties after intermediate steps of query processing from constant properties, and/or identifying distinct properties through background processes.

EP derivation can be performed in different scenarios. In some embodiments where, for example, a table has duplicate rows, pruning may be performed during compilation and this pruning information may be used to derive distinct properties and eliminate redundant tables. EP derivation of distinct properties can also occur independent of pruning.

For EP-based join elimination, the distinct property can be detected at various levels of metadata without relying on constraints. During DML operations, for example, when new partitions are created, the system may automatically detect whether a column is unique within that partition. The system may also collect min/max information for that partition and other EPs.

For online distinctness derivation, consider two cases. In a first case, if there is only one partition in the table, and that partition is unique for the target column, the system may determine that column is unique globally. In a second case, if there are multiple partitions in the table, and each of the partitions are unique, and the ranges (min/max values) of target columns do not overlap, the system may determine that column is unique globally.

For offline/persisted distinctness detection, the system can persist distinctness properties at the intermediate level (region-level distinctness) for multi-level partition metadata. A region is defined as containing the aggregated metadata for a disjoint subset of partitions in the table. The logic to determine region level distinctness is similar to the two cases described above, where the systems look into all partitions within that region and persist distinctness properties at the region level. Global level distinctness could be deduced similarly from EP-file level distinctness and persisted in Global Cumulative EPs.

Moreover, the set of input partitions and regions can be adjusted dynamically based on multiple rounds of pruning. For persisted distinctness (at partition/region/global level), pruning does not impact distinctness property because pruning out additional partitions/regions will not change a distinct column to a non-distinct column.

In some embodiments, during metadata-based distinctness determination (e.g., EP based), the system may first check global level distinctness if it has already been persisted. If not, the system may check region level distinctness for all regions that remain in the scanset after pruning. For non-distinct regions, the system may check partition-level distinctness using the steps described above (e.g., "online distinctness derivation").

Figure 9:
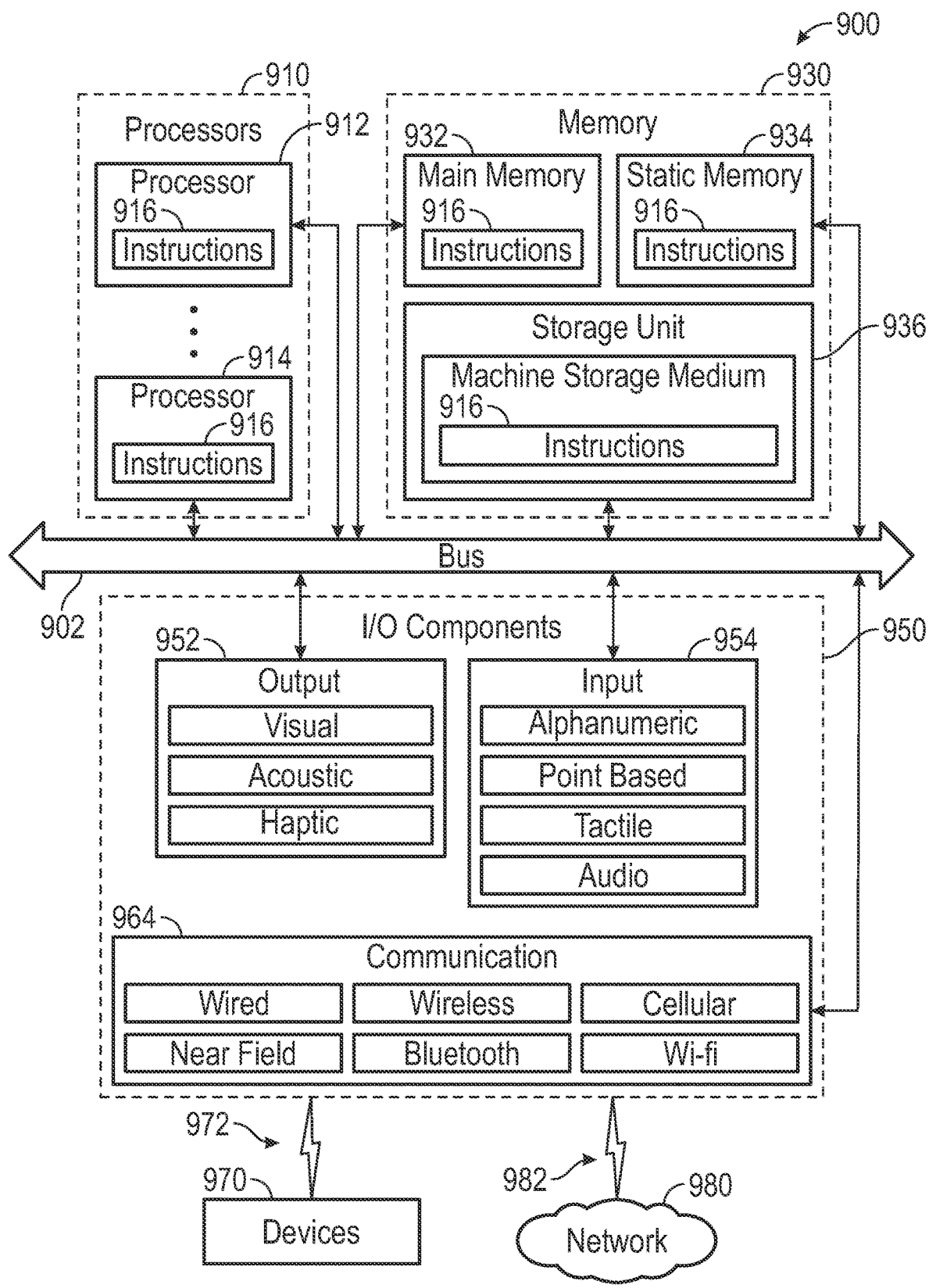
FIG. 9 illustrates a diagrammatic representation of a machine in the form of a computer system within which a set of instructions may be executed for causing the machine to perform any one or more of the methodologies discussed herein, in accordance with some embodiments of the present disclosure.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute any one or more operations of any one or more of the methods described herein. As another example, the instructions 916 may cause the machine 900 to implement portions of the data flows described herein. In this way, the instructions 916 transform a general, non-programmed machine into a particular machine 900 (e.g., the remote computing device 106, the access management system 118, the compute service manager 112, the execution platform 114, the Web proxy 120) that is specially configured to carry out any one of the described and illustrated functions in the manner described herein.

In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 includes processors 910, memory 930, and input/output (I/O) components 950 configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, all accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 include components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, and other communication components to provide communication via other modalities. The devices 970 may be another machine or any of a wide variety of peripheral devices (e.g., a peripheral device coupled via a universal serial bus (USB)). For example, as noted above, the machine 900 may correspond to any one of the remote computing device 106, the access management system 118, the compute service manager 112, the execution platform 114, the Web proxy 120, and the devices 970 may include any other of these systems and devices.

The various memories (e.g., 930, 932, 934, and/or memory of the processor(s) 910 and/or the storage unit 936) may store one or more sets of instructions 916 and data structures (e.g., software) embodying or utilized by any one or more of the methodologies or functions described herein.

These instructions 916, when executed by the processor(s) 910, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Described implementations of the subject matter can include one or more features, alone or in combination as illustrated below by way of example.

Example 1. A method comprising: generating, by at least one hardware processor, a query plan node based on a received query; generating a join graph representation of the query plan node including one or more nodes and one or more edges, the one or more nodes representing one or more tables associated with the received query and the one or more edges representing join relationships between the nodes; identifying a redundant table involved in one or more joins based on the join graph representation; removing the identified redundant table from the join graph representation and the query plan node; generating a simplified query plan node based on the removing of the identified redundant table; and executing the simplified query plan node to generate results for the received query.

Example 2. The method of example 2, further comprising: unnesting subqueries in the received query.

Example 3. The method of any of examples 1-2, wherein generating the graph representation includes traversing a query tree from a top-level join node Example 4. The method of any of examples 1-3, wherein the identified redundant table is removed from a Unique-Key (UK) outer join, a primary key (PK)-PK self join, or a PK-Foreign Key (FK) join.

Example 5. The method of any of examples 1-4, further comprising: adding a filtering operation in the simplified query plan node based on the removing of the identified redundant table.

Example 6. The method of any of examples 1-5, wherein identifying the redundant table is performed based on query properties.

Example 7. The method of any of examples 1-6, wherein the query properties include a subsumption property.

Example 8. The method of any of examples 1-7, wherein identifying the redundant table is performed based on data properties.

Example 9. The method of any of examples 1-8, wherein identifying the redundant table is performed based on distinctness properties derived from constant properties.

Example 10. The method of any of examples 1-9, wherein identifying the redundant table is performed based on a configuration properties.

Example 11. A system comprising: one or more processors of a machine; and a memory storing instructions that, when executed by the one or more processors, cause the machine to perform operations implementing any one of example methods 1 to 10.

Example 12. A machine-readable storage device embodying instructions that, when executed by a machine, cause the machine to perform operations implementing any one of example methods 1 to 10.

What is claimed is:

1. A method comprising:
   generating, by at least one hardware processor, a query plan node based on a received query;
   generating a join graph representation of the query plan node including one or more nodes and one or more edges, the one or more nodes representing one or more tables associated with the received query and the one or more edges representing join relationships between the nodes, the one or more tables each including a plurality of partitions;
   retrieving metadata associated with the one or more tables;
   identifying at least one region in the one or more tables as being non-distinct based on the metadata, a region including a set of two or more partitions of the plurality of partitions;
   comparing metadata of the plurality of partitions in the identified at least one region of the one or more tables;
   identifying at least a redundant partition in the one or more tables involved in one or more joins based on the join graph representation and based on comparing metadata of the plurality of partitions in the one or more tables;
   removing the at least redundant partition from the join graph representation and the query plan node;
   generating a simplified query plan node based on the removing of the at least redundant partition;
   adding a filtering operation in the simplified query plan node based on the removing of the identified redundant at least partition; and
   executing the simplified query plan node to generate results for the received query.

2. The method of claim 1, further comprising:
   unnesting subqueries in the received query.

3. The method of claim 1, wherein generating the graph representation includes traversing a query tree from a top-level join node.

4. The method of claim 1, wherein the identified redundant at least partition is removed from a Unique-Key (UK) outer join, a primary key (PK)-PK self join, or a PK-Foreign Key (FK) join.

5. A machine-storage medium embodying instructions that, when executed by a machine, cause the machine to perform operations comprising:
   generating a query plan node based on a received query;
   generating a join graph representation of the query plan node including one or more nodes and one or more edges, the one or more nodes representing one or more tables associated with the received query and the one or more edges representing join relationships between the nodes, the one or more tables each including a plurality of partitions;
   retrieving metadata associated with the one or more tables;
   identifying at least one region in the one or more tables as being non-distinct based on the metadata, a region including a set of two or more partitions of the plurality of partitions;
   comparing metadata of the plurality of partitions in the identified at least one region of the one or more tables;
   identifying at least a redundant partition in the one or more tables involved in one or more joins based on the join graph representation and based on comparing metadata of the plurality of partitions in the one or more tables;

removing the at least redundant partition from the join graph representation and the query plan node;

generating a simplified query plan node based on the removing of the at least redundant partition;

adding a filtering operation in the simplified query plan node based on the removing of the identified redundant at least partition; and executing the simplified query plan node to generate results for the received query.

6. The machine-storage medium of claim 5, further comprising:

unnesting subqueries in the received query.

7. The machine-storage medium of claim 5, wherein generating the graph representation includes traversing a query tree from a top-level join node.

8. The machine-storage medium of claim 5, wherein the identified redundant at least partition is removed from a Unique-Key (UK) outer join, a primary key (PK)-PK self join, or a PK-Foreign Key (FK) join.

9. A system comprising:
at least one hardware processor; and
at least one memory storing instructions that, when executed by the at least one hardware processor, cause the at least one hardware processor to perform operations comprising:
generating a query plan node based on a received query;
generating a join graph representation of the query plan node including one or more nodes and one or more edges, the one or more nodes representing one or more tables associated with the received query and the one or more edges representing join relationships between the nodes, the one or more tables each including a plurality of partitions;
retrieving metadata associated with the one or more tables;
identifying at least one region in the one or more tables as being non-distinct based on the metadata, a region including a set of two or more partitions of the plurality of partitions;
comparing metadata of the plurality of partitions in the identified at least one region of the one or more tables;
identifying at least a redundant partition in the one or more tables involved in one or more joins based on the join graph representation and based on comparing metadata of the plurality of partitions in the one or more tables;
removing the at least redundant partition from the join graph representation and the query plan node;
generating a simplified query plan node based on the removing of the at least redundant partition;
adding a filtering operation in the simplified query plan node based on the removing of the identified redundant at least partition; and
executing the simplified query plan node to generate results for the received query.

10. The system of claim 9, further comprising:
unnesting subqueries in the received query.

11. The system of claim 9, wherein generating the graph representation includes traversing a query tree from a top-level join node.

12. The system of claim 9, wherein the identified redundant at least partition is removed from a Unique-Key (UK) outer join, a primary key (PK)-PK self join, or a PK-Foreign Key (FK) join.

* * * * *